Nov. 20, 1934.          G. W. SCHULTZ          1,981,200
AUTOMATIC CLOSING FIRE VALVE

Filed March 29, 1932

George W. Schultz
INVENTOR

Patented Nov. 20, 1934

1,981,200

UNITED STATES PATENT OFFICE 1,981,200

AUTOMATIC CLOSING FIRE VALVE

George W. Schultz, Reading, Pa.

Application March 29, 1932, Serial No. 601,851

8 Claims. (Cl. 137—162)

This invention relates to improvements in valves for controlling the flow of inflammable gas, ammonia gas, gas used for operating refrigerating plants, gasoline, kerosene, oil, and all other combustible gases or liquids, or dangerous or poisonous gases or liquids, and its leading object is to provide a valve which is held in normally open position, but which will automatically close when there is a dangerous or abnormal temperature increase, or when fire conditions develop.

Another object of the invention is to provide a valve closing attachment, which will operate under abnormal temperatures to produce a turning off effect, which can be applied to a standard type of valve construction, with slight structural changes of the same.

A still further object of the invention is the provision of a valve for closing the line of flow from the source of supply to the consumer, or outlet, with a self closing mechanism, which includes an operating shaft or element, a spring for operating the same, and a fusible element which functions to hold the shaft and spring against movement under normal temperature conditions, but which melts to release the spring and allow the shaft to operate the valve, so that it is automatically forced to closing position when an abnormal temperature condition develops, as when a fire breaks out in the vicinity of the valve.

With the above and other objects in view, the invention consists in certain new and useful combinations, constructions, and arrangements of parts, clearly described in the following specification, and fully illustrated in the accompanying drawing, in which:—

Figure 1:
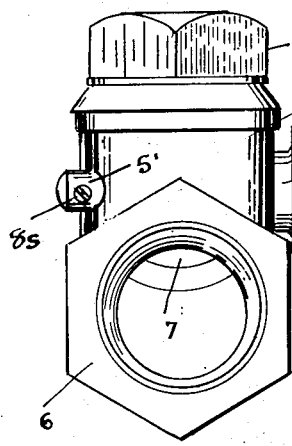
Fig. 1 is an end view of a standard type of valve equipped with my improved closing device.
Figure 2:
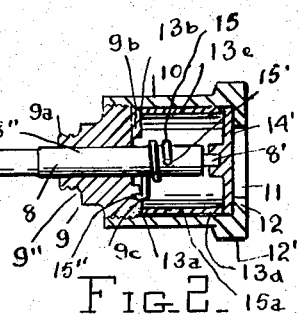
Fig. 2 is a longitudinal sectional view through my device, shown detached from the valve, illustrating in elevation the set screw for retaining the valve shaft in place.
Figures 3, 4, 5, 6:
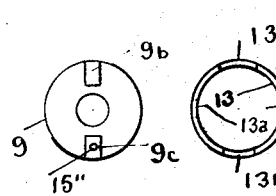
Fig. 3 is an end view of the connecting plug.
Fig. 4 is an end view of a tubular element.
Fig. 5 is a side view thereof.
Fig. 6 is an end view of the fusible disc or element.
Figure 7:
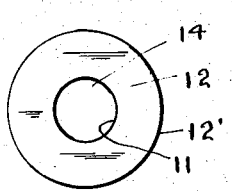
Fig. 7 is an end view of the closing device.
Figure 8:
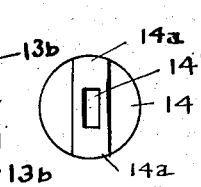
Fig. 8 is a detail end view of the shaft key.
Figure 9:
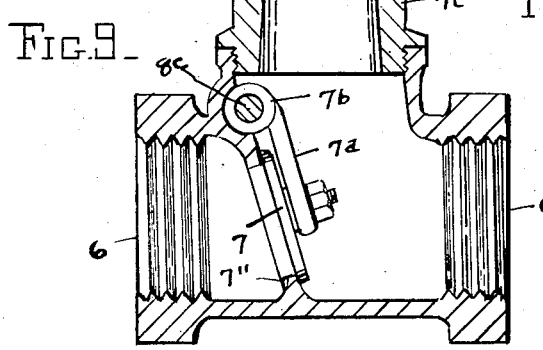
Fig. 9 is a central longitudinal sectional view through the valve body, showing the valve element thereof in closed position.

Referring to the accompanying drawing illustrating the practical construction of my invention, 5 designates a valve body of standard construction type, having an outlet 6 and an inlet 6'. These outlet and inlet members may be suitably internally threaded in accordance with any desired system of coupling.

Within the valve body a valve 7 is arranged. This valve is shown carried by an arm 7a, which is provided with a bearing eye 7b, through which the pivot shaft 8 extends. The arm 7a is suitably coupled or attached to the valve 7. The valve 7 is designed to engage the seat 7", and thereby prevent the flow of gas or other fluent material through the valve body. The usual cap 7c is threaded in the valve body.

The shaft 8 extends into the case or housing 10, through the connecting plug 9, which is provided with a reduced and externally threaded nipple 9a, which is threaded into an opening formed in the side of the valve body 5, in line with the usual bearing boss 5' formed in said body. The inner end of the shaft 8 is reduced and formed with a V-shaped groove 8v, which is engaged by the conically pointed set screw 8s, which is threaded through the side of the bearing boss 5'. The shaft 8 is thickened at 8", where it engages the connecting plug 9, and the portion 8c is designed to have a tight fit with the bearing eye 7b. The outer end of the shaft 8 is formed with a flattened key 8', which engages in a slot or key socket 14' formed in the relatively thin fusible disc or element 14. This disc or element is disposed against the end wall 12 of the housing 10, and this end wall is formed with a relatively large opening 11, through which the outer face of the fusible element or disc is normally exposed to the atmosphere of the room in which it is installed.

The connecting plug 9 is formed with integral key lugs 9b and 9c, located on the inner side of the same, which is enclosed by the housing 10, while the fusible disc or element 14 is formed with a transverse lug 14a, in which the socket 14' is formed. A tubular retaining element 13 is arranged between the connecting plug and the fusible disc, and is formed with recesses or slots 13a in one end thereof to receive the lugs 9b and 9c of the connecting plug, and in the opposite end is formed with recesses or slots 13b to receive the transverse lug 14a of the fusible element 14.

A coil spring 15, constructed of corrosion proofed wire, is mounted on the shaft 8, and one end 15' thereof is inserted in a recess formed in the shaft, while the other end thereof is bent forwardly and engages in a recess 15" formed in the connecting plug 9. This coil spring is under normal tension, due to the fact that the shaft 8 is given a slight twist or turn when the parts are assembled, and the force of this spring tension is sufficient to hold the valve 7 in a closed position.

Due to the fact that the fusible element is keyed to the valve shaft, and the further fact that the fusible element is held against relative movement in the housing 10, by the interlocking action of the retaining tube 13, which normally prevents turning of the fusible element, the valve shaft is held against turning under normal conditions.

When an abnormal temperature develops, as when fire conditions break out, the fusible element will be melted, and thus the valve shaft will be released for turning, and as the restrained spring is thereby freed, the valve shaft will be caused to turn, thereby swinging the valve from normally open to a closed position.

This action takes place automatically, and can be predetermined for different temperatures, by controlling the alloy of which the fusible element or disc is composed.

When a fusible element is melted, thereby shutting off the flow of the gas or liquid passing through the valve body, the pressure of the spring and the pressure of the gas or liquid will keep the valve in closed position.

The set screw 8s is adjusted so that the valve shaft 8 can freely turn, and serves merely to hold the shaft against endwise displacement. By releasing the set screw and unthreading the connecting plug 9 from the valve body, the attachment may be entirely removed from the valve body.

The closing action takes place instantaneously with the rise of fire temperature conditions, and will operate for the control of the flow of any gas or fluent material, such as gaoline, oil chemicals, inflammable gases, or gases or liquids used in refrigeration, or otherwise.

The rear end of the housing 10 is formed with a knurled ring 12', so that the same can be turned by hand, to manually unthread the housing from the connecting plug, to separate the same from the connecting plug.

The valve body, being of standard construction, is conventionally formed with an opening located on the side opposite to the bearing boss 5'. This standard form of opening is slightly enlarged and then screw threaded to receive the nipple 9a of the connecting plug, which is tightly threaded into the valve body.

The fusible element or disc is made relatively thin so that it will be sensitive to any increase of temperature, and when it does melt will readily flow outwardly, so as to not clog up the opening of the housing.

The fusible element may be of any suitable composition, as a low-melting-point alloy metal, wax, gutta percha, rubber, or other composition material, capable of flowing when subjected to an abnormally high temperature, and may be constructed to melt at a temperature of approximately 140 degrees, Fahr.

The invention provides an automatic valve closing means, which insures complete safety against the destructive waste of gas or fluid, due to the effects of fire. By automatically stopping the further flow of ammonia and similar gases, which are extremely dangerous to life, or which prevent free operation of firemen, controlled safety is made possible in all plants or places which operate refrigerating equipment, or similar devices.

By automatically shutting off the supply of inflammable gases or oils firemen can direct their relief agencies toward the control of the combustion of other materials, than those piped to the location where the fire is active.

Various changes in the details of construction, combination and arrangements of parts, may be resorted to, without departing from the spirit of the invention, as defined in the claims annexed hereto.

I claim as new:—

1. The combination with a flow controlling valve including a valve housing having an intake and discharge port and a valve element movable within the housing to close communication between said intake and discharge ports, a pivot shaft with which the valve element turns from open to closed position having a bearing on said valve housing, said pivot shaft extending outwardly of the valve housing, a plug and housing detachably connected with the valve housing and providing a bearing for said pivot shaft, a spring on said pivot shaft having one end fixed to the shaft, said plug having engagement with the spring to maintain same under tension, and a fusible element holding the shaft against turning movement in the housing and in valve open position.

2. A flow controlling valve including a housing, a pivot shaft having a bearing in the housing and projecting laterally thereof, a swing valve carried by said shaft for preventing flow through the housing, a spring connected at one end to the pivot shaft and tending to turn the shaft in one direction, a hollow member providing a bearing for said shaft and enclosing said spring and detachably connected with the housing, and means for locking said shaft against turning movement by the spring and enclosed by said member and including a fusible element.

3. The combination with a flow controlling valve having a pivot shaft, a plug connected with the body of the valve and forming a bearing through which the shaft extends, a retaining tube having interlocking engagement with the plug, a fusible element interlocked to the retaining tube and shaft, a coil spring on the shaft having one end engaging the connecting plug, the other end of the spring engaging the shaft to turn the same, and a housing coupled to the connecting plug and having an opening closed by the fusible element.

4. The combination with a valve body having an outlet, a valve arranged in the body to close the outlet, a shaft having a bearing on the valve body and connected to the valve to swing the same from normally open to closed position, said shaft extending through the side of the valve body, a plug detachably connected with the valve body and forming an external bearing for the shaft, a spring for turning the shaft, a fusible element coupled to the shaft to hold the shaft against turning, and a housing coupled to the plug and providing an opening which is closed by the fusible element.

5. The combination with a valve construction including a body and an operating shaft extending through the body, a plug detachably connected with the body and forming a bearing for the shaft, a housing detachably coupled to the plug and provided with an end wall formed with an opening, a fusible disc disposed against the opening of the end wall to close the same, said fusible disc being keyed to the shaft to hold the same against turning, a tube enclosed by the housing and keyed at one end to the plug and at the other end to the fusible disc, and means for turning the shaft when the fusible disc melts.

6. The combination with the valve body having an inlet and outlet, a swing valve mounted in the valve body to close the outlet thereof, a pivot shaft for said swing valve having an end portion projecting through the body, a plug and housing detachably connected with the body and providing a bearing for said pivot shaft, a spring in said housing engaging said pivot shaft having a bearing against the plug for moving the swing valve to closed position and a fusible element for locking said shaft to the plug against relative movement and in valve open position.

7. The combination with the valve body having an inlet and outlet, a valve for closing the outlet including an operating element projecting through the body, a plug and housing detachably connected with the body and enclosing the projecting end of the operating element, said housing having an opening, a fusible element closing said opening and interlocked to the shaft and said plug to prevent operation of the valve, and a spring enclosed by the housing and engaging said operating element to move the valve to closed position when the fusible element melts.

8. The combination of the valve body having a flow passage therethrough, a valve for closing said passage, said valve body being provided with a bearing on one side and an opening on the opposite side, a shaft having one end disposed in the bearing and the other end extending through the opening and carrying the valve, a plug detachably connected in said opening and forming a bearing for said shaft, a case detachably connected with said plug and provided with an end opening, a member enclosed by said case and having interlocking connection with the plug to prevent relative rotation with the case, a spring engaging the shaft and said plug to move the valve to closed position, and a fusible disc interlocked with the shaft and said member and closing said end opening to hold the valve in normal open position.

GEORGE W. SCHULTZ.